(No Model.)
H. HOPKINS & A. E. JOHNSON.
THROTTLE VALVE.
No. 347,041. Patented Aug. 10, 1886.
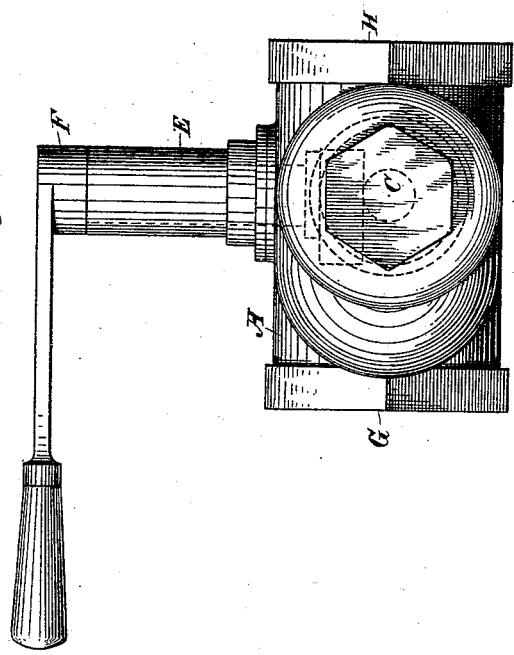
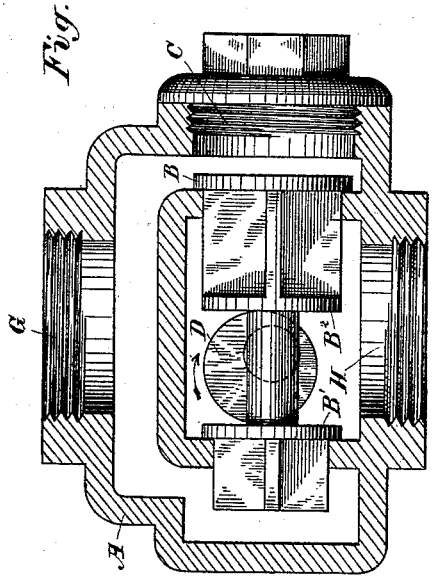
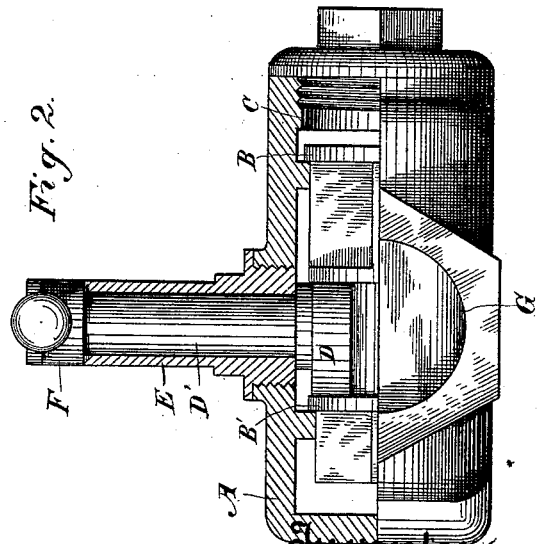
Witnesses,
Geo. H. Strong.
J. H. Nourse.
Inventors,
Herbert Hopkins
A. E. Johnson
By Dewey & Co
Attys

United States Patent Office.

HERBERT HOPKINS AND ALFRED E. JOHNSON, OF AUSTIN, NEVADA.

THROTTLE-VALVE.

SPECIFICATION forming part of Letters Patent No. 347,041, dated August 10, 1886.

Application filed May 24, 1886. Serial No. 203,158. (No model.)

*To all whom it may concern:*

Be it known that we, HERBERT HOPKINS and ALFRED E. JOHNSON, of Austin, Lander county, State of Nevada, have invented an Improvement in Throttle-Valves; and we hereby declare the following to be a full, clear, and exact description of the same.

Our invention relates to a novel construction and operation for throttle-valves, such as are employed for opening or closing the passage by which steam is admitted to the cylinders of engines or other steam-passages for gas or vapor under process.

It consists of a double disk or balance puppet-valve with guiding-flanges and intermediate disk, an eccentric mounted upon a shaft so as to rotate between the back of one of the valve-disks and the intermediate disk and shaft, and a handle by which it is operated so as to open or close the valve.

Referring to the accompanying drawings for a more complete explanation of our invention, Figure 1 is a vertical section taken in the plane of the axis of the valve through it and the valve-chamber. Fig. 2 is a horizontal section through the axis of the valve and at right angles with the section shown in Fig. 1. Fig. 3 is an exterior end view.

A is the shell, which is bored to receive the valve B B'. This valve is a double disk or puppet valve, having a disk at each end, these disks forming bearings on seats in the shell, so as to close the openings through which they pass. They are provided with wings or flanges, which pass through the openings of the seats, and serve to guide the valve as it moves out or in.

C is a screw-cap at one end of the valve-casing, through which the valve may be introduced or removed. Steam is admitted through the passage G in the valve-casing, passing around the interior portion of the shell, so as to press against the opposite sides of the two disks B B'. The disk B being the largest, the pressure will be greater upon it, and will thus keep the two securely seated, so as to make a tight joint. When the valves are open, the steam passes from this exterior space to the space between the two seats, passing out thence through the discharge-passage H. In order to open or close the valve, an eccentric, D, is fixed upon a shaft, D', which passes through the sleeve E, extending from one side of the casing and forming a bearing for the shaft.

$B^2$ is a disk formed between the two disks B B' of the valve, and at such a point that the eccentric D just fits between the disks B' $B^2$, with its face in contact with both. It will be seen that when the eccentric D is turned in one direction it will move the valve backward, raising the disks from their seats, so as to allow steam to pass through. When turned in the opposite direction, it will press the valves against their seats, thus closing them. At the same time the action of the eccentric will be to rotate the valve upon its own axis, because the eccentric stands between the disks at one side of the central shaft which unite the two parts of the valve. This rotation is of service in two ways—first, because it reduces the friction between the eccentric and the disks, and, secondly, because in rotating the valve always presents a new surface to the seat when it again closes, which has a tendency to cause the valve and seat to wear evenly and make it wear a longer period.

Upon the end of the shaft E is a lever-handle, F, by which it is rotated, and with it the eccentric is turned.

The sleeve E, through which the shaft D' passes, is of such a length that, in connection with the collar or eccentric which fits against the sleeve from the inside, it will prevent leakage at this point without the use of any stuffing-box, and more especially as no steam-pressure can come upon this point except when the valve is open.

Having thus described our invention, what we claim as new, and desire to secure by Letters Patent, is—

1. In a throttle-valve, the body or shell having double concentric seats, a valve composed of disks fitting these seats, and an intermediate disk upon the valve-stem and connected with one of the valve-disks by guiding-flanges, in combination with an eccentric above the valve-stem, and rotating in contact with said intermediate disk and one of the valve-disks, substantially as described.

2. The body or shell having the double seats, the valve-disks closing upon them, and an intermediate disk upon the valve-stem and connected with one of the valve-disks by guiding-flanges, in combination with an eccentric supported at one side of the valve-stem, between said valve-disk and intermediate disk, and in contact with said disks, a shaft upon which the eccentric is mounted, and a handle or lever attached to said shaft, by which the eccentric is rotated, substantially as herein described.

In witness whereof we have hereunto set our hands.

HERBERT HOPKINS.
ALFRED E. JOHNSON.

Witnesses:
J. A. MILLER,
W. T. HIGBY.